(12) United States Patent  
Tsiberidis

(10) Patent No.: US 11,618,279 B2  
(45) Date of Patent: Apr. 4, 2023

(54) AERODYNAMIC WHEEL RIM

(71) Applicant: GV ENGINEERING GMBH, Heimsheim (DE)

(72) Inventor: Konstantin Tsiberidis, Untergruppenbach (DE)

(73) Assignee: GV Engineering GmbH, Heimsheim (DE)

( * ) Notice: Subject to any disclaimer, the term of this patent is extended or adjusted under 35 U.S.C. 154(b) by 443 days.

(21) Appl. No.: 16/755,752

(22) PCT Filed: Oct. 12, 2018

(86) PCT No.: PCT/EP2018/077963  
§ 371 (c)(1),  
(2) Date: Apr. 13, 2020

(87) PCT Pub. No.: WO2019/073068  
PCT Pub. Date: Apr. 18, 2019

(65) Prior Publication Data  
US 2021/0031559 A1 Feb. 4, 2021

(30) Foreign Application Priority Data

Oct. 14, 2017 (DE) .......................... 102017009746.1

(51) Int. Cl.  
*B60B 21/02* (2006.01)  
*B60B 7/00* (2006.01)  
*B01D 46/10* (2006.01)

(52) U.S. Cl.  
CPC ............ *B60B 21/026* (2013.01); *B60B 7/002* (2013.01); *B01D 46/10* (2013.01); *B60B 7/00* (2013.01)

(58) Field of Classification Search  
CPC ......... B60B 21/026; B60B 7/002; B60B 7/00; B60B 2900/513; B60T 5/00; B01D 46/10  
See application file for complete search history.

(56) References Cited

U.S. PATENT DOCUMENTS

| | | | |
|---|---|---|---|
| 4,593,953 A * | 6/1986 | Baba ........................ | B60B 7/00 301/6.3 |
| 5,772,286 A | 6/1998 | Jordan | |
| 9,919,555 B2 * | 3/2018 | Wippler ................ | B60B 7/0086 |
| 10,744,816 B2 * | 8/2020 | Bach ..................... | B60B 7/0066 |
| 2007/0199751 A1 * | 8/2007 | Bradley ............... | B60K 11/085 180/68.1 |
| 2008/0036285 A1 * | 2/2008 | Davis ..................... | B60B 19/10 301/37.25 |
| 2009/0195053 A1 * | 8/2009 | Kruse ................... | B60B 7/0053 301/6.4 |

(Continued)

FOREIGN PATENT DOCUMENTS

| | | |
|---|---|---|
| DE | 3816415 A1 | 11/1989 |
| DE | 102011010509 A1 | 8/2012 |
| EP | 3112205 A1 | 1/2017 |

OTHER PUBLICATIONS

PCT International Search Report and Written Opinion completed by the ISA/EP dated Jan. 16, 2019 and issued in connection with PCT/EP2018/077963.

(Continued)

*Primary Examiner* — Frank B Vanaman  
(74) *Attorney, Agent, or Firm* — Barnes & Thornburg LLP

(57) ABSTRACT

The invention relates to a wheel rim for a vehicle wheel with cover elements.

25 Claims, 13 Drawing Sheets

(56) References Cited

U.S. PATENT DOCUMENTS

| | | | |
|---|---|---|---|
| 2013/0313889 A1* | 11/2013 | Schmid | B60B 7/04 301/37.107 |
| 2014/0175858 A1* | 6/2014 | Platto | B60B 7/00 301/37.101 |
| 2015/0069822 A1* | 3/2015 | Haase | B60B 1/06 301/37.101 |
| 2017/0282643 A1* | 10/2017 | Hasegawa | B60K 11/085 |

OTHER PUBLICATIONS

PCT International Preliminary Examination Report mailed by the ISA/EP dated Jan. 16, 2020 and issued in connection with PCT/EP2018/077963.

\* cited by examiner

FIG. 5
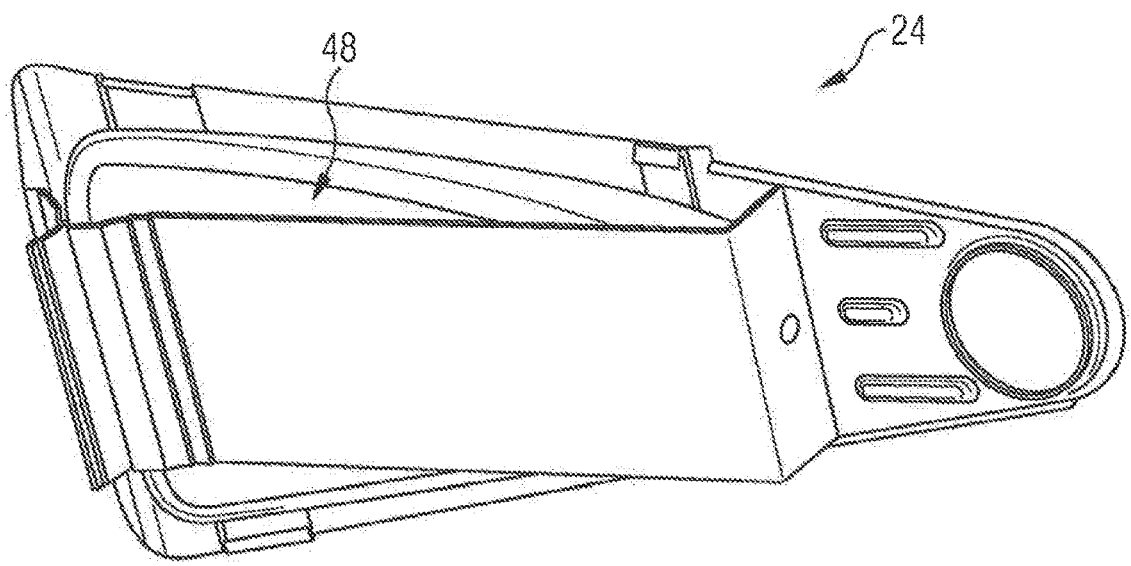
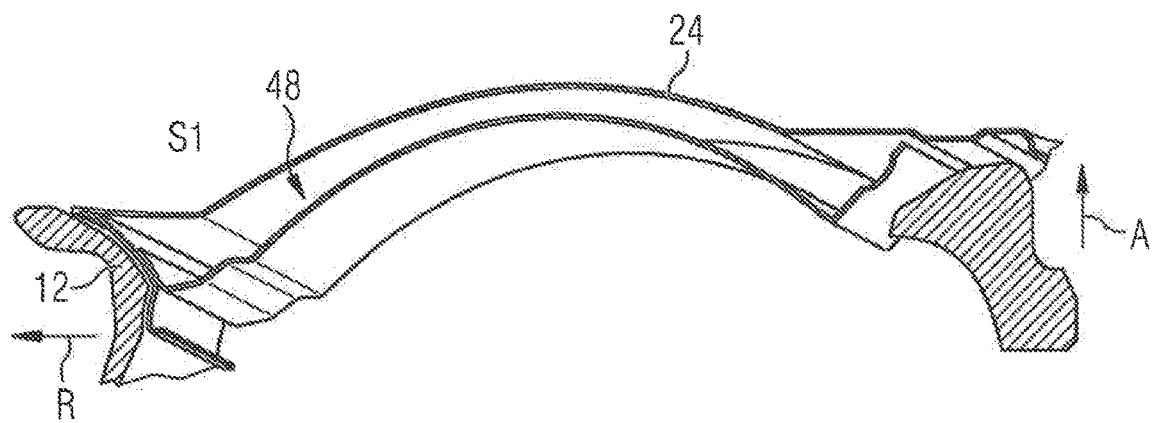
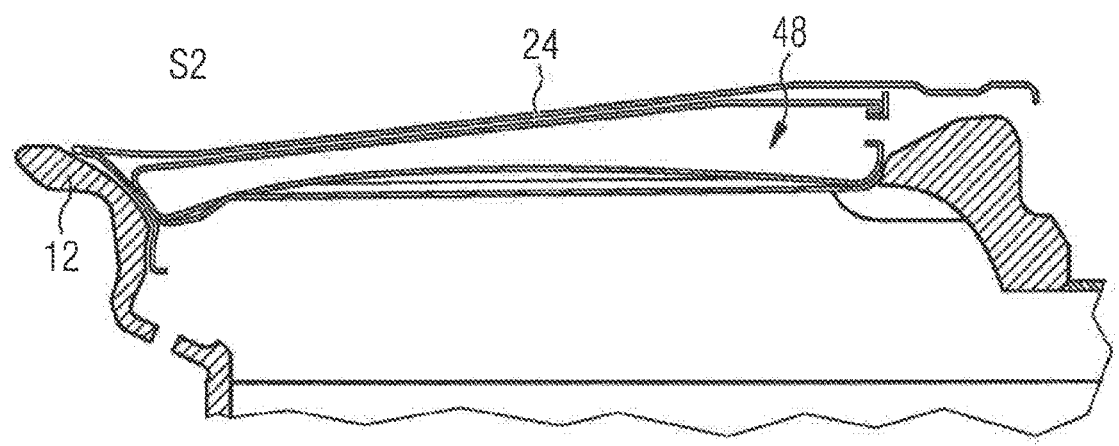

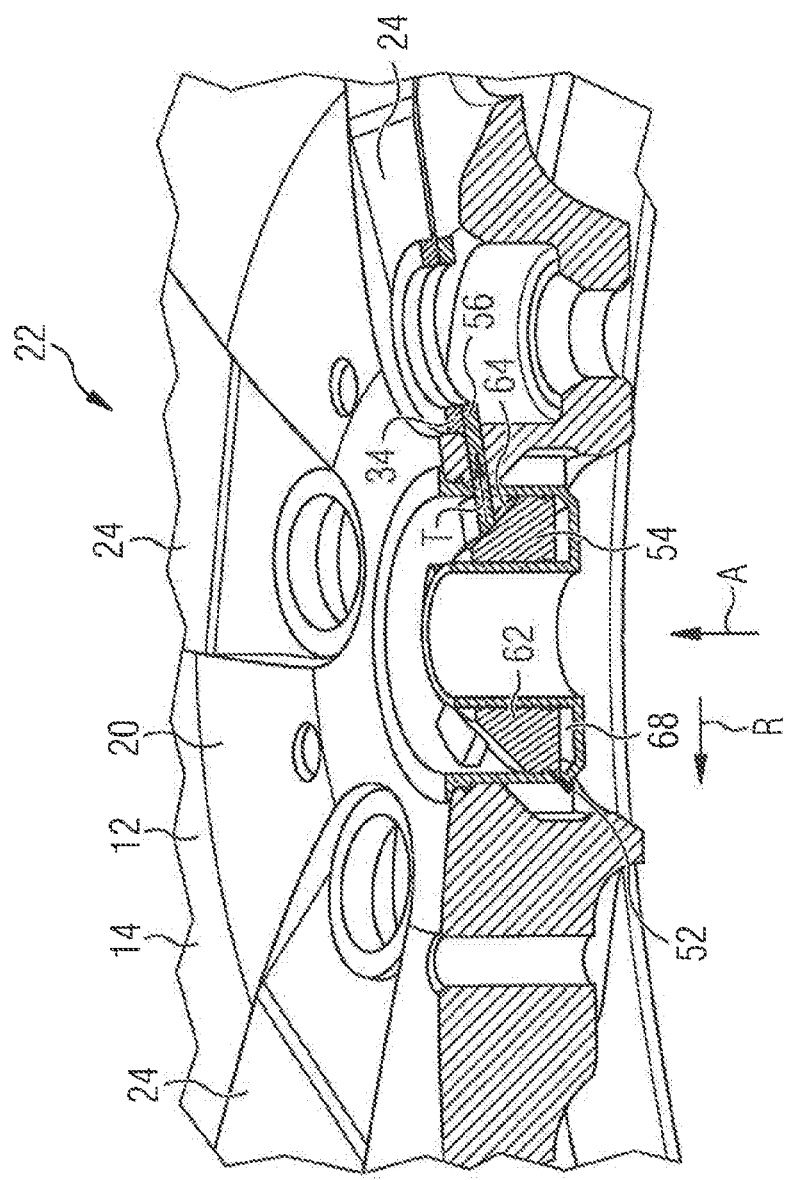
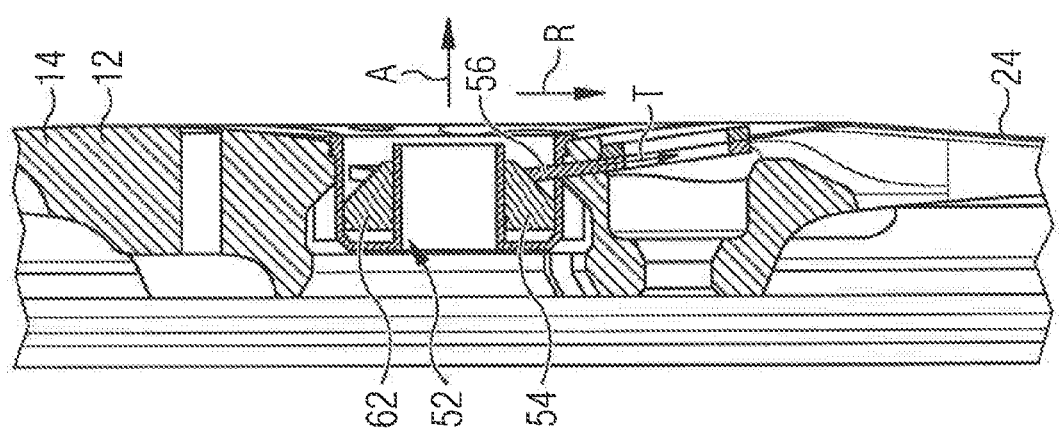
FIG. 9

FIG. 10
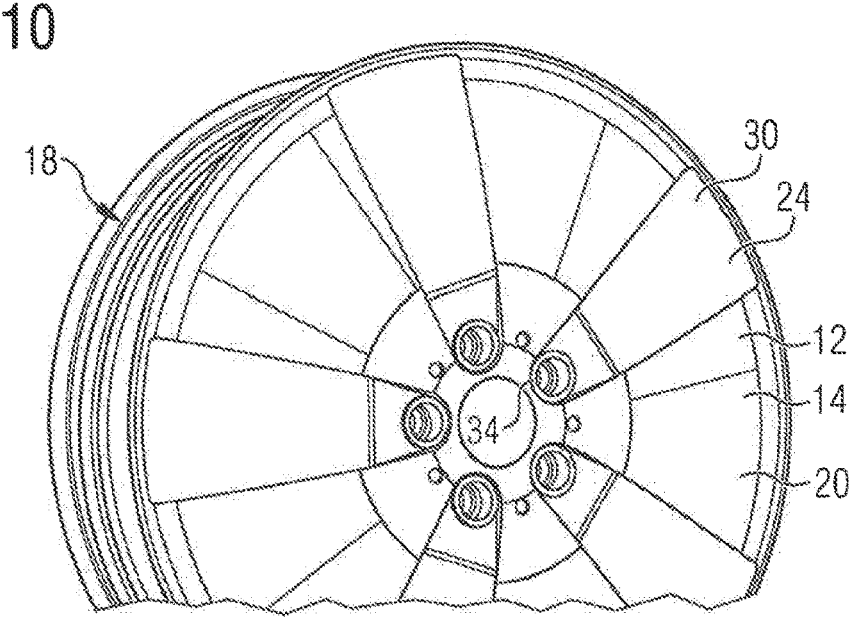
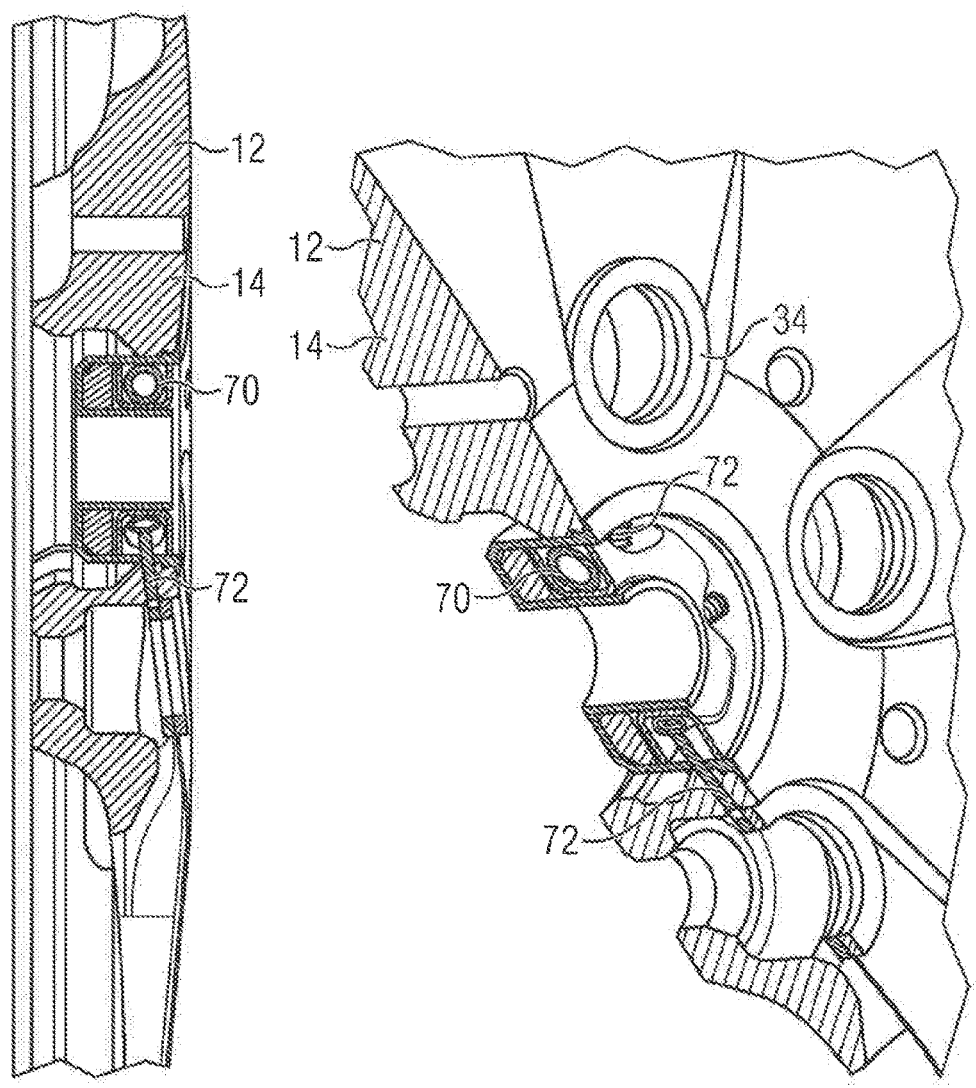

AERODYNAMIC WHEEL RIM

CROSS-REFERENCE TO RELATED APPLICATIONS

This is a national stage entry of International Patent Application No. PCT/EP2018/077963, filed Oct. 12, 2018, which claims the benefit of and priority to German Patent Application No. 10 2017 009 746.1, filed Oct. 14, 2017, the disclosures of which are expressly incorporated herein by reference in their entireties.

The present invention relates to a wheel rim for a vehicle wheel according to the preamble of claim 1. That is to say, a wheel rim for a vehicle wheel having a rim body which has a hub portion, a rim well for receiving a tire, multiple carrier portions arranged between the hub portion and the rim well, and at least one gap arranged between the carrier portions, wherein the wheel rim has at least one cover element associated with the gap, wherein the cover element can be transferred, preferably by actuation via an actuating device, at least from a first position into a second position, and wherein a covering of the gap by the cover element in the first position is different from a covering of the gap by the cover element in the second position.

The design of modern wheel rims is subject to different requirements, some of which conflict with one another. On the one hand, the wheel rim is to have a wheel rim contour which permits simple manufacture, on the other hand a central requirement is that the wheel rim permits maximum air flow, in order to allow a brake disk of a vehicle brake to be cooled optimally via the air stream if required. Furthermore, when the temperature of the brake disk rises when the vehicle is stationary, it must be ensured that the heat can be transported away even without an air flow.

In conventional wheel rims, this results in the requirement for as "open" a rim structure as possible, that is to say that the gaps account for as large a part of the wheel rim as possible.

For aerodynamic reasons, however, the wheel rim should be as closed as possible in order to prevent as far as possible air turbulence which occurs due to the gaps, which are often also referred to as rim apertures.

In normal driving operation, an excess pressure prevails in the region of the underbody of the vehicle, which ensures that air is forced through the gaps of the wheel rim. This leads to high air turbulence. If the wheel rim were to be in the form of a closed disk, the Cw value, which is a factor in the realization of the air resistance of the vehicle, could be improved.

In order to meet these requirements which, on the one hand for thermal and on the other hand for aerodynamic reasons, are in effect contradictory, it is known to be able to open and close the apertures on the wheel rim side as required by the use of movable cover elements.

There are known, for example, cover elements which open and close under the effect of centrifugal force. These cover elements thus open, for example, when a certain limit speed is exceeded as a result of the centrifugal force acting on them.

However, such systems do not work reliably and are also able to open or close the cover elements only above a certain speed. In other words, opening takes place not in dependence on requirements but in dependence on speed.

Accordingly, the object of the present invention is to provide a wheel rim for a vehicle wheel which works reliably and meets the requirements both of aerodynamics and of cooling of the brakes.

This object is achieved according to the invention on the one hand by a wheel rim for a vehicle wheel as claimed in claim 1. The wheel rim according to the invention is thus characterized in that the cover element deforms, preferably elastically reversibly, when it is transferred between the first position and the second position.

In a variant of the invention, the cover element is transferred from the first position into the second position by deformation.

It is advantageous if the cover element comprises a fastening portion which is undisplaceably connected to the rim body of the wheel rim. The cover element is thus fixed securely to the rim body. The fastening portion is preferably arranged on the cover element located radially outwards and/or located radially outwards in the peripheral direction. The cover element preferably has a flat extent extending predominantly in the radial direction and the peripheral direction. The gap can thus always be opened and closed reliably and securely.

It is advantageous if the cover element comprises an actuating portion which is movable relative to the rim body of the wheel rim. Preferably, the actuating portion is arranged on the cover element located radially inwards and/or located outwards in the peripheral direction. Preferably, the actuating portion is displaceable relative to the rim body of the wheel rim. The actuating portion can, however, also be pivotable relative to the rim body. Preferably, the actuating portion is displaceable relative to the rim body of the wheel rim in an axial direction and/or in a radial direction and/or in a peripheral direction.

Preferably, the actuating portion is positively driven in the rim body on a predefined movement path.

In particular by combining the actuating portion with the above-mentioned fastening portion, simple transfer of the cover element from the first position into the second position, during which the cover element deforms, can be achieved. For this purpose, the actuating portion can be moved via the actuating device, for example.

It is advantageous if the cover element in the first position or the second position is in a closed state in which the gap is closed by the cover element. The aerodynamics of the wheel rim is increased by the closed state of the cover element. Preferably, the cover element can adopt further intermediate positions.

It is advantageous if the cover element in the first position or the second position is in a maximally open state in which the gap is at least partially freed by the cover element. Air is thus able to flow through the gap. Thus, when the wheel rim is used on a vehicle, hot waste air can escape from the region of the brakes, or cold air from outside can flow to the brake.

It is advantageous if the cover element in the maximally open state is curved axially outwards or axially inwards at least in some regions. An axially outward curve has the advantage that air can be guided into the gap by the cover element.

It is advantageous if the cover element can adopt an angled state. Advantageously, the cover element deforms relative to the first or the second position when it is transferred into the angled state. Preferably, the cover element can be transferred into an angled state by means of the actuating device. For example, the actuating portion can thereby be movable via the actuating device in such a manner that the cover element adopts the angled position. An angled position means a position in which an edge of the cover element on the peripheral direction side is lifted further from the rim body than the opposite edge of the cover element on the peripheral direction side.

It is advantageous if the cover element deforms, preferably elastically reversibly, when it is transferred into the angled state.

It is advantageous if the cover element in the angled state is so arranged relative to the rim body that, when the wheel rim rotates about the axial direction, air is guided by the cover element into the gap. It is thereby possible to create almost a ventilation effect for the rim interior, or the brake of the vehicle on which the wheel rim is used. Alternatively, the cover element in the angled state can also be so arranged that it in effect guides air out of the gap. This example is to be made possible in that the cover element lies with its side that is to the front in the peripheral direction in the direction of rotation flush with the carrier portion delimiting the gap, and on the opposite side in the peripheral direction is lifted from the further carrier portion which delimits the gap. As a result, when the wheel rim rotates in the direction of rotation, a low pressure can in effect form behind the open side of the cover element and air can pass out of the gap. Hot air can thus be dissipated from the braking system.

It is advantageous if the cover element, when it is in the angled state, is lifted from the rim body with an edge on the peripheral direction side and lies against the rim body with an opposite edge on the peripheral direction side.

It is advantageous if the rim body has at least two gaps, wherein each gap has an associated cover element. Preferably, the wheel rim has multiple gaps, each of which has an associated cover element. Preferably, a cover element is associated with each of the gaps. It is advantageous if the cover elements of the above-mentioned embodiments each have the features of the cover element of one or more of the embodiments described hereinabove or hereinbelow. As a result, a sufficient flow through the gaps can be ensured if required and, on the other hand, if a flow through the gaps is not desired, a very aerodynamic wheel rim can be provided.

It is advantageous if the surface of the wheel rim that is remote from the vehicle, when seen in the axial direction, is free of openings, preferably and free of projections, when the cover element or cover elements is/are in the closed state. The wheel rim is thus particularly aerodynamic when the cover elements are in the closed state. As a result, when the wheel rim rotates, the turbulence is particularly low, which reduces the air resistance of a vehicle equipped with the wheel rim.

Advantageously, the cover element or elements is or are so configured that, when the cover element or elements is/are in the closed state, the cover element or cover elements extend(s) flush with the carrier portions which delimit the respective gap with which the cover element in question is associated.

It is advantageous if the actuating device is so configured that the cover element can be transferred from the first position into the second position by pneumatic, electrical or magnetic actuation. The cover element can thus be transferred securely and reliably from the first position into the second position.

It is advantageous if the wheel rim has an inner cover element associated with the gap. The inner cover element is configured and arranged to be arranged in the gap in the region of the side of the wheel rim on the vehicle side. In other words, the inner cover element is arranged on the side of the rim body that faces the vehicle. It is thereby advantageous if the inner cover element can be transferred at least from a first position into a second position by actuation via the actuating device, wherein a covering of the gap by the cover element in the first position is different from a covering of the gap by the cover element in the second position. Preferably, the inner cover element deforms when it is transferred between the first position and the second position. Preferably, this deformation is elastically reversible.

It is advantageous if the inner cover element and the cover element curve in the same direction, preferably axially outwards, when they are transferred into the maximally open state. The curve of the inner cover element and of the cover element can thus be particularly space-saving.

The cover element and the inner cover element can be coupled with one another, in particular connected mechanically, in particular via a connecting element extending in the axial direction.

Alternatively, it can also be advantageous if the inner cover element and the cover element curve in different directions when they are transferred into the maximally open state, preferably the cover element curves axially outwards and the inner cover element curves axially inwards. Maximum flow through the gap can thereby be made possible.

It is advantageous if the inner cover element extends flush with the carrier portions which delimit the respective gap with which the inner cover element is associated, when the inner cover element is in the closed state. Turbulence is thus suppressed particularly efficiently.

It is advantageous if the cover element and/or the inner cover element is/are configured so as to deform, in particular curve, when a voltage is applied. Preferably, the cover element and/or the inner cover element is/are thereby formed of or comprise(s) a material that deforms, preferably curves, when a voltage is applied. It is thus possible to create an actuating device, for example, by simply attaching electrical contacts. By simply applying a voltage, the cover element or the inner cover element can adopt different positions.

It is advantageous if the cover element is so configured that it returns to the first position when it has not been transferred by the actuating device into a position other than the first position and held therein. For this purpose, the cover element can be biased into a specific position, for example into the first position, in particular biased by its own elasticity.

Preferably, the cover element comprises a shape memory material or consists of such a material. For example, the shape memory material can deform under the effect of heat and return to its original state again on cooling. Thus, automatic opening of the cover element can be ensured if the brake system overheats.

It is generally advantageous if the cover element deforms in dependence on its temperature, and in particular is transferred from the first position into the second position on heating.

It is advantageous if an electromagnet, which can change an electromagnetic field around the cover element, is arranged on the rim body, preferably on a carrier portion, wherein the cover element is so configured that it is deformable by the change in the magnetic field of the electromagnet, and in particular is transferred from the first position into the second position when the magnetic field of the electromagnet changes.

It is advantageous if the cover element has a material thickness in the axial direction which changes over its surface, which extends in the peripheral direction and the radial direction. Specific deformations can thus be achieved with simple mechanical loading of the cover element. For example, the cover element can deform in a complex manner when the actuating portion is moved translationally.

It is advantageous if the cover element is so configured and arranged that it has an air attack surface which is so configured and arranged that the air resistance urges the cover element from the first position into the second position or from the second position into the first position when the wheel rim is rotating about the axial direction.

It is advantageous if the wheel rim comprises multiple cover elements which are coupled with one another in terms of their transfer from their respective first position into their respective second position. If one of the coupled cover elements alone moves from the first position into the second position, then the cover elements coupled therewith also move into the second position. It is also within the meaning of the invention if at least two cover elements are coupled with one another in that manner.

It is advantageous if it comprises at least one cover element which comprises a pressure-receiving region to which a pressure medium can be applied, wherein the cover element is in the first position when the pressure medium is not applied to the pressure-receiving region and deforms into the second position when the pressure medium is applied to the pressure-receiving region. Preferably, the pressure-receiving region is so configured and arranged that, when pressure medium is applied thereto, it leads to deformation of the cover element. A tire cavity of the vehicle wheel comprising the wheel rim can thereby serve as the pressure medium source.

A pressure medium channel from the tire cavity to the actuating device can thereby be provided. The pressure medium channel can extend at least in part through the material of the rim body. The pressure medium channel can extend at least in some regions, preferably completely, in the material of the wheel rim, preferably in the material of one of the carrier portions. A compressor arrangement for providing pressure medium under pressure can also serve as the pressure medium source. Advantageously, the compressor arrangement is arranged in the region of the wheel rim. It is advantageous if the compressor arrangement comprises at least one compression chamber on the hub side. The pressure medium under pressure can thus be provided directly to the rotating rim body, so that rotary feedthroughs, for example, become unnecessary.

It is advantageous if a filter element is arranged in the gap, which filter element is configured to filter brake dust particles from the air which flows through the gap.

It is advantageous if the actuating device comprises a transmission having a transmission element on the rim body side and having a transmission element on the cover element side, wherein the transmission element on the cover element side is coupled with the actuating portion of the cover element, and wherein the transmission is so configured that it converts a movement of the transmission element on the rim body side into a movement of the transmission element on the cover element side.

It is advantageous if the wheel rim comprises at least two cover elements which are each connected by their actuating portion to a respective transmission element on the cover element side, wherein the transmission is so configured that it converts a movement of the transmission element on the rim body side into a movement of the transmission element on the cover element side.

The transmissions or transmission elements described above can be configured in different ways. For example, the transmission element on the rim body side can be in the form of a cam disk or in the form of a cam track. The transmission element on the cover element side can be in the form of a tappet output. The coupling between the transmission element on the rim body side and the transmission element on the cover element side can comprise a force-based means for ensuring positive movement (for example via biasing, in particular spring biasing, of the transmission element on the cover element side) or a form-fitting means for ensuring positive movement (for example via engagement of the transmission element on the cover element side into a cam track or guide groove of the transmission element on the rim body side).

The transmission element on the rim body side can be configured to be translational, for example in the axial direction, or rotational, for example about the axial direction.

The transmission element on the rim body side can be movable, in particular rotationally and/or translationally movable, pneumatically or electrically or purely mechanically, for example.

The transmission element on the cover element side can be movable translationally and/or rotationally. Advantageously, the transmission element on the cover element side is so mounted that it is movable solely translationally.

It is advantageous if the actuating device comprises an expansion element which is coupled with the actuating portion of the cover element in such a manner that a change in volume of the expansion element brings about a movement of the actuating portion of the cover element. Advantageously, a deformation of the cover element is brought about by the movement of the actuating portion. In particular, it is advantageous if the above-described movement of the actuating portion brings about a transfer of the cover element from the first position into the second position. For example, the cover element can be transferrable from a closed position into a maximally open position by movement of the actuating portion caused by a change in volume of the expansion element. The expansion element can represent an example of an actuating device. An expansion element can be a variable-volume body formed in one piece. In particular, an expansion element can be configured without rigid elements which are displaceable translationally relative to one another. An expansion element can in particular have elastic walls. In particular, the expansion element can be so arranged and configured that elastic walls of an expansion element bring about a movement of a transmission element on the cover element side, which is preferably in the form of a tappet output, when the volume of the expansion element changes.

It is advantageous if the actuating device is actuatable pneumatically by means of pressure medium. A tire cavity of the vehicle wheel comprising the wheel rim can thereby serve as a pressure medium source. A pressure medium channel can thereby be provided from the tire cavity to the actuating device. The pressure medium channel can extend at least in part through the material of rim body. The pressure medium channel can extend at least in some regions, preferably completely, in the material of the wheel rim, preferably in the material of one of the carrier portions. A compressor arrangement for providing pressure medium under pressure can also serve as the pressure medium source. Advantageously, the compressor arrangement is arranged in the region of the wheel rim. It is advantageous if the compressor arrangement comprises at least one compression chamber on the hub side. The pressure medium under pressure can thus be provided directly at the rotating rim body, so that rotary feedthroughs, for example, become unnecessary.

It is preferred if the cover element in its closed state contacts the rim body with all its edges. It is further preferred if, in the open state, a region of the cover elements that is in the middle in the radial direction lifts from the rim body. Advantageously, a radially inner and a radially outer region lie against the rim body.

In the above-mentioned compressor arrangements, it is advantageous if they comprise a compressor component and the pressure medium can be placed under pressure by a movement, preferably a translational movement, of the compressor component.

Also within the meaning of the invention is a vehicle wheel as claimed in the preceding claim, characterized in that it is mountable on a wheel carrier to be rotatable about an axis of rotation, and the compressor arrangement comprises a transmission, preferably a cam transmission, which is adapted to convert a rotational movement between the wheel carrier side and the wheel hub side into a movement, preferably an oscillating translational movement, of the compressor component by cooperation of a transmission part on the wheel carrier side with a transmission part on the hub side.

In the case of electrical actuation of the actuating device, an energy producer, or generator, or an energy store, or accumulator, can be attached in various ways.

An energy producer or an energy store can be arranged, for example, in the region of the hub cover. A stator of such a generator, or energy producer, can be constituted by an eccentrically mounted weight.

An energy producer, or generator, can be mounted on a seat in the inner region of the rim, for example in the flanging zone with the brake disk chamber. Such a generator can be designed with an external nose which is fixed (prevented from rotating) via a counter-holder fastened to the brake caliper.

A generator integrated in the wheel bearing is possible. In the case of such a generator, a connection, for example a sliding contact, with the rim must then be established.

Further features, possible applications and advantages of the invention will become apparent from the following description of exemplary embodiments of the invention, which are explained with reference to the drawing, wherein the features can be fundamental to the invention both on their own and in different combinations, without explicit reference again being made thereto. In the drawing:

FIG. 5 shows a cover element of a wheel rim according to the invention in various representations;

FIG. 9 shows a wheel rim according to the invention in various representations;

FIG. 10 shows a wheel rim according to the invention in various representations;

In the following figures, corresponding components and elements bear the same reference numerals. For the sake of better clarity, not all the reference numerals are reproduced in all the figures.

Figure 1:
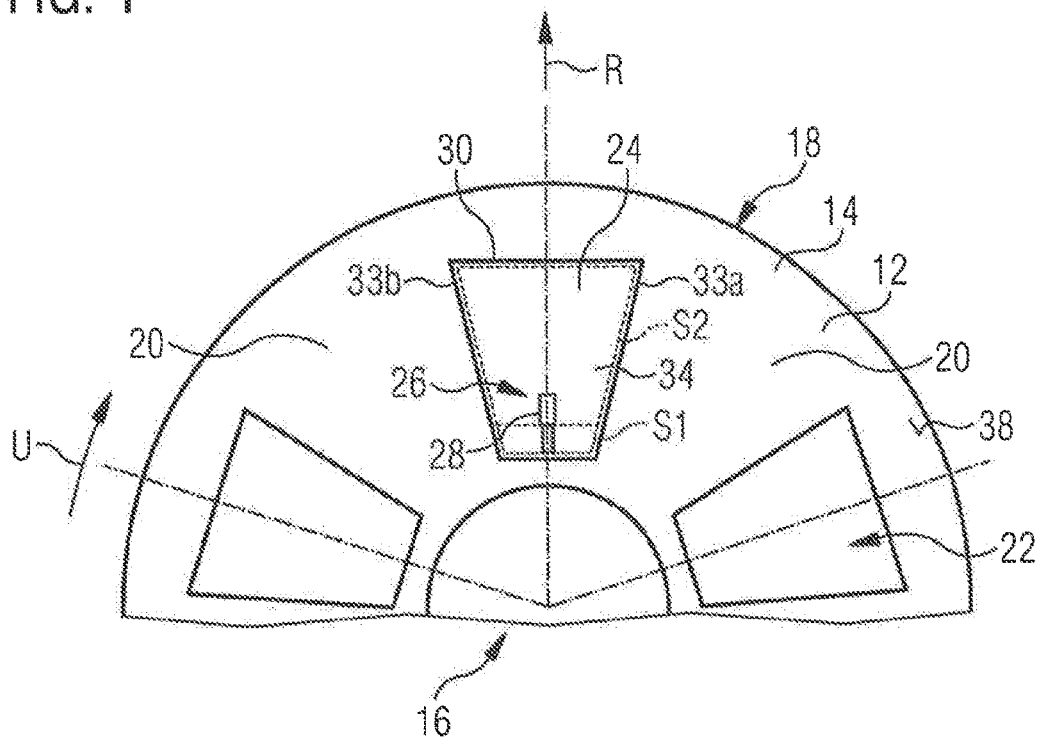
FIG. 1 shows a wheel rim according to the invention in a schematic representation.

FIG. 1 shows a partial representation of a wheel rim 12 for a vehicle wheel 2. A radial direction R is represented by a corresponding arrow and a peripheral direction U is represented by a corresponding curved arrow. An axial direction A is likewise represented by a corresponding arrow.

The wheel rim 12 comprises a rim body 14 which comprises a hub portion 16 and a rim well 18 for receiving a tire 3, not shown in FIG. 1. The rim body 14 comprises multiple carrier portions 20 arranged between the hub portion 16 and the rim well 18. Gaps 22 are arranged between the carrier portions 20.

The wheel rim has for each gap 22 a cover element 24 associated with the gap 22. In FIG. 1, only one of these cover elements 24 is shown.

The cover elements 24, preferably and as illustrated in FIG. 1, can be transferred at least from a first position S1 (FIG. 2b) into a second position S2 (FIG. 2a) by actuation via an actuating device 26.

A covering, or a degree of covering, of the gap 22 by the cover element 24 in the first position S1 is different from a covering of the gap 22 by the cover element 24 in the second position S2.

The cover element 24 deforms when it is transferred between the first position S1 and the second position S2. The deformation is in the present case elastically reversible.

In its relaxed state, the cover element 24 of FIGS. 1 and 2 adopts the position S2, which is curved in the present example. Via the actuating device 26, the cover element 24 can be stretched out of position S2 and brought into position S1.

In the embodiment of FIG. 1, the actuating device 26 is configured with multiple pressure cylinders 28. The pressure cylinders 28 can be controllable individually or jointly. Preferably, the pressure cylinders 28, and thus the actuating device 26, are actuatable by application of a pressure medium.

The pressure medium for application to the actuating device 26 can, for example, come from the tire cavity or be provided by a compressor arrangement 10.

The compressor arrangement 10 will be explained in greater detail hereinbelow.

The cover element 24 of FIGS. 1 and 2 has a fastening portion 30 located radially outwards, which is undisplaceably connected to the rim body 14 of the wheel rim 12. The fastening portion 30 is pivotably connected to the rim body 14 via a joint 32.

The cover element 24 has, as depicted in FIG. 1, a first edge 33a on the peripheral direction side and an opposite second edge 33b on the peripheral direction side.

The cover element 24 of FIGS. 1 and 2 has an actuating portion 34 located radially inwards, which is displaceable in the radial direction R relative to the rim body 14 of the wheel rim 12. The actuating portion 34 is pivotably attached to the pressure cylinder 28 via a pivot joint 36.

Figure 2A:
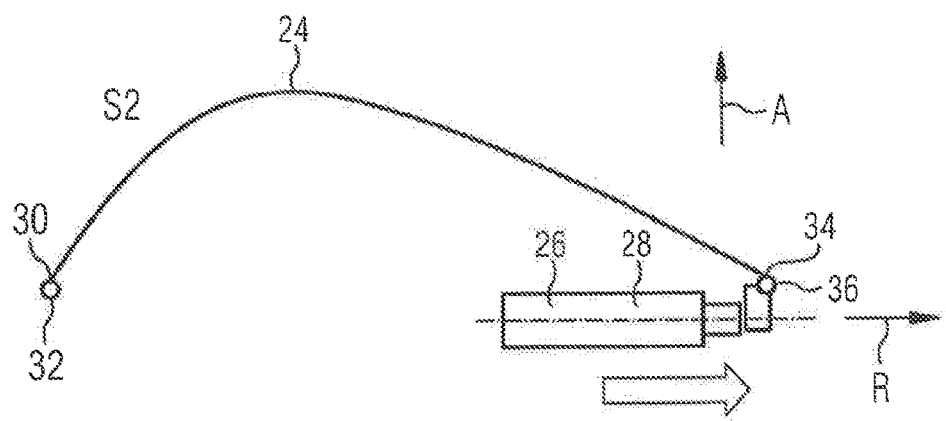
FIGS. 2(a and b) show a cover element of a wheel rim according to the invention in two schematic representations.

The cover element 24 of FIGS. 1 and 2 is in a maximally open state in the second position S2 shown in FIG. 2a. In the maximally open state, the gap 22 is at least partially freed by the cover element 24 (upper representation FIG. 2).

Figure 2B:
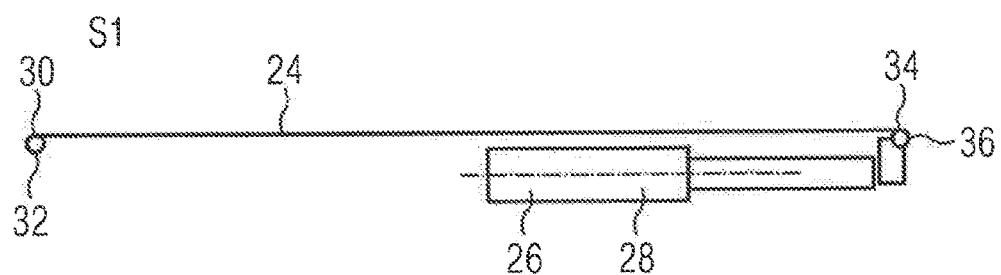

The cover element 24 of FIGS. 1 and 2 is in a closed state in the first position S1 shown in FIG. 2b, in which state the gap 22 is closed by the cover element 24 (lower representation in FIG. 2).

In the maximally open state, the cover element 24 is curved axially outwards. In the present case, it extends in an arcuate manner.

As already mentioned above, the rim body 14 has multiple gaps 22 (in the present case five, which are equally distributed in the peripheral direction). All the gaps 22 have an associated cover element 24. Preferably, the wheel rim 12 comprises multiple gaps 22 of the same type, which each have an associated cover element 24 of the same type.

Preferably, all the gaps 22 of the wheel rim 12 are configured in the same manner, and cover elements 24 of the same type are associated with each of them. It is also possible for the wheel rim 12 to have multiple types of gaps 22. One type of gaps 22 can thereby be provided with cover elements 24, preferably of the same type, and another type of gaps 22 can be configured without cover elements 24.

The wheel rim 12 is preferably, as shown in FIG. 1, so configured that, when the cover element 24, or the cover elements 24, is/are in the closed state, which in the present case corresponds to the first position S1, the surface 38 (shown in FIG. 1) of the wheel rim 12 that is remote from the vehicle, when seen in the axial direction A, is free of openings, preferably and free of projections. When the cover elements 24 are closed, the wheel rim 12 forms a substantially smooth and closed surface.

The cover element 24, or the cover elements 24, extend(s) flush with the carrier portions 20 which delimit the respective gap 22 with which the cover element 24 in question is associated, when the cover element 24, or the cover elements 24, is/are in the closed state.

The actuating device 26 is in the present case so configured that the cover element 24 can be transferred from the second position S2 into the first position S1 by pneumatic actuation. For this purpose, pressure medium is applied to the pressure cylinders 28, so that they are extended and move the actuating portion 34 in the radial direction.

The actuating device 26 can also be actuatable electrically or purely mechanically. In the case of an electrically actuatable actuating device 26, a generator can be arranged on the wheel rim 12, for example, which generator can use the rotation between the wheel carrier side and the wheel hub side to generate electrical energy. In the case of purely mechanical actuation, the above-mentioned rotation can be used, for example, in response to a radio signal to switch a transmission.

Figure 3:
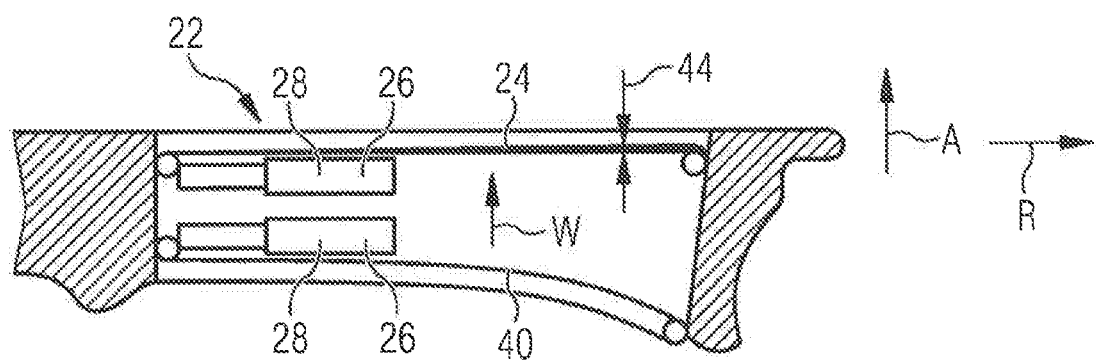
FIG. 3 shows a cover element and an inner cover element of a wheel rim according to the invention in a schematic representation.

The wheel rim 12 of FIG. 3, which is shown in section in the radial direction R, comprises an inner cover element 40 associated with the gap 22. The inner cover element 40 can be transferred from a first position into a second position by actuation via the actuating device 26, similarly to the cover element 24. The actuating device 26 can, as shown, be configured separately from the actuating device 26 for the cover element 24 or can be configured to be connected thereto. In other words, an actuating device 26 can be present which actuates the cover element 24 and the inner cover element 40. A covering of the gap 22 by the inner cover element 40 in the first position is thereby different from a covering of the gap 22 by the inner cover element 40 in the second position. The inner cover element 40 is arranged on the side of the rim body 14 that faces the vehicle. The inner cover element 40 deforms, preferably elastically reversibly, when it is transferred between the first position and the second position.

When the inner cover element 40 and the cover element 24 are transferred into the maximally open state, they curve in the same direction, in the present case axially outwards, which is indicated by the arrow W. However, it is also conceivable that the inner cover element 40 and the cover element 24 curve in different directions. Preferably, the cover element 24 then curves axially outwards and the inner cover element 40 curves axially inwards.

The inner cover element 40 extends flush with the carrier portions 20 which delimit the respective gap 22 with which the inner cover element 40 is associated, when the inner cover element 40 is in the closed state.

It is possible to form the wheel rim in such a manner that the cover element 24 and/or the inner cover element 40 is/are configured so as to deform, in particular curve, when a voltage is applied, preferably wherein the cover element 24 and/or the inner cover element 40 is/are formed of a material, or comprise(s) a material, that deforms, preferably curves, when a voltage is applied.

It is possible that the cover element 24 deforms in dependence on its temperature, and in particular is transferred from the first position S1 into the second position S2 on heating.

An electromagnet, which can change an electromagnetic field around the cover element, can be arranged on the rim body 14, preferably on a carrier portion 20, wherein the cover element 24 can be so configured that it is deformable by the change in the magnetic field of the electromagnet, and in particular is transferred from the first position S1 into the second position S2 when the magnetic field of the electromagnet changes.

The cover element 24 of FIG. 3 has a material thickness 44 in the axial direction A which changes over its surface, which extends in the peripheral direction U and in the radial direction R.

The cover element 24 can be so configured and arranged that it has an air attack surface 46 which is so configured and arranged that the air resistance urges the cover element 24 from the first position S1 into the second position S2 or from the second position S2 into the first position S1 when the wheel rim 12 rotates about the axial direction A. This is shown in FIG. 4.

Figure 4:
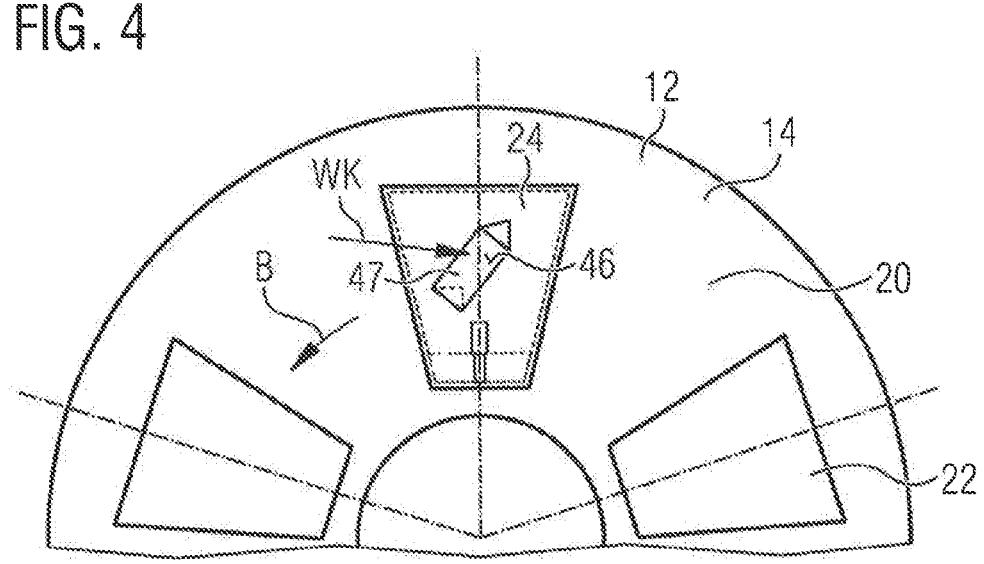
FIG. 4 shows a wheel rim according to the invention in a schematic representation.

The cover element 24 of FIG. 4 has a ramp-like elevation 47, which comprises the air attack surface 46. The ramp-like elevation 47 is so arranged and configured that the airstream, when the wheel rim 12 rotates in the direction indicated by the arrow B, exerts a force WK, which is indicated by a corresponding arrow, on the cover element 24 and urges it into the closed state.

The wheel rim 12 can also be so configured that it comprises at least one cover element 24 which comprises a pressure-receiving region 48 to which a pressure medium can be applied. This is shown in FIG. 5.

The cover element 24 is in the first position S1 when the pressure medium is not applied to the pressure-receiving region, and deforms into the second position S2 when the pressure medium is applied to the pressure-receiving region 48. In the embodiment of FIG. 5, the first position S1 is the maximally open position and the second position S2 is the closed position. However, it can also be the other way round. The first position S1 and the second position S2 can also be different from the closed position and the maximally open position.

Figure 6:
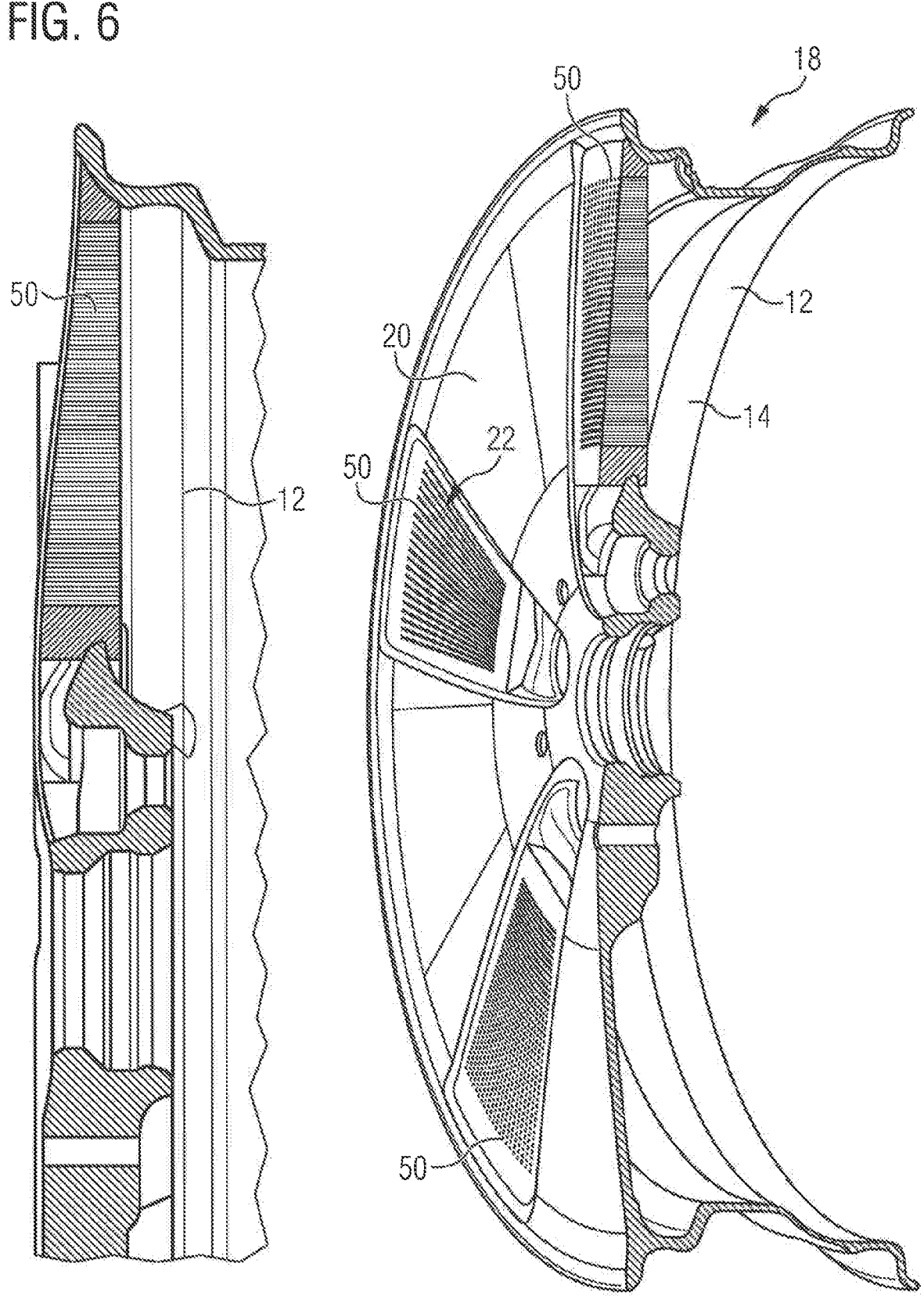
FIG. 6 shows a wheel rim according to the invention in various representations.

As shown in FIG. 6, in the wheel rim 12 there can be arranged in the gap 22, in addition to the cover element 24, a filter element 50, which is configured to filter brake dust particles out of the air which flows through the gap 22. In FIG. 6, the cover element 24 is not shown, so that the filter element 50 is visible.

The actuating device 26 can comprise a transmission 52 having a transmission element 54 on the rim body side and having a transmission element 56 on the cover element side, wherein the transmission element 56 on the cover element side is coupled with the actuating portion 34 of the cover element 24, and wherein the transmission 52 is so configured that it converts a movement of the transmission element 54 on the rim body side into a movement of the transmission element 56 on the cover element side.

Figure 7:
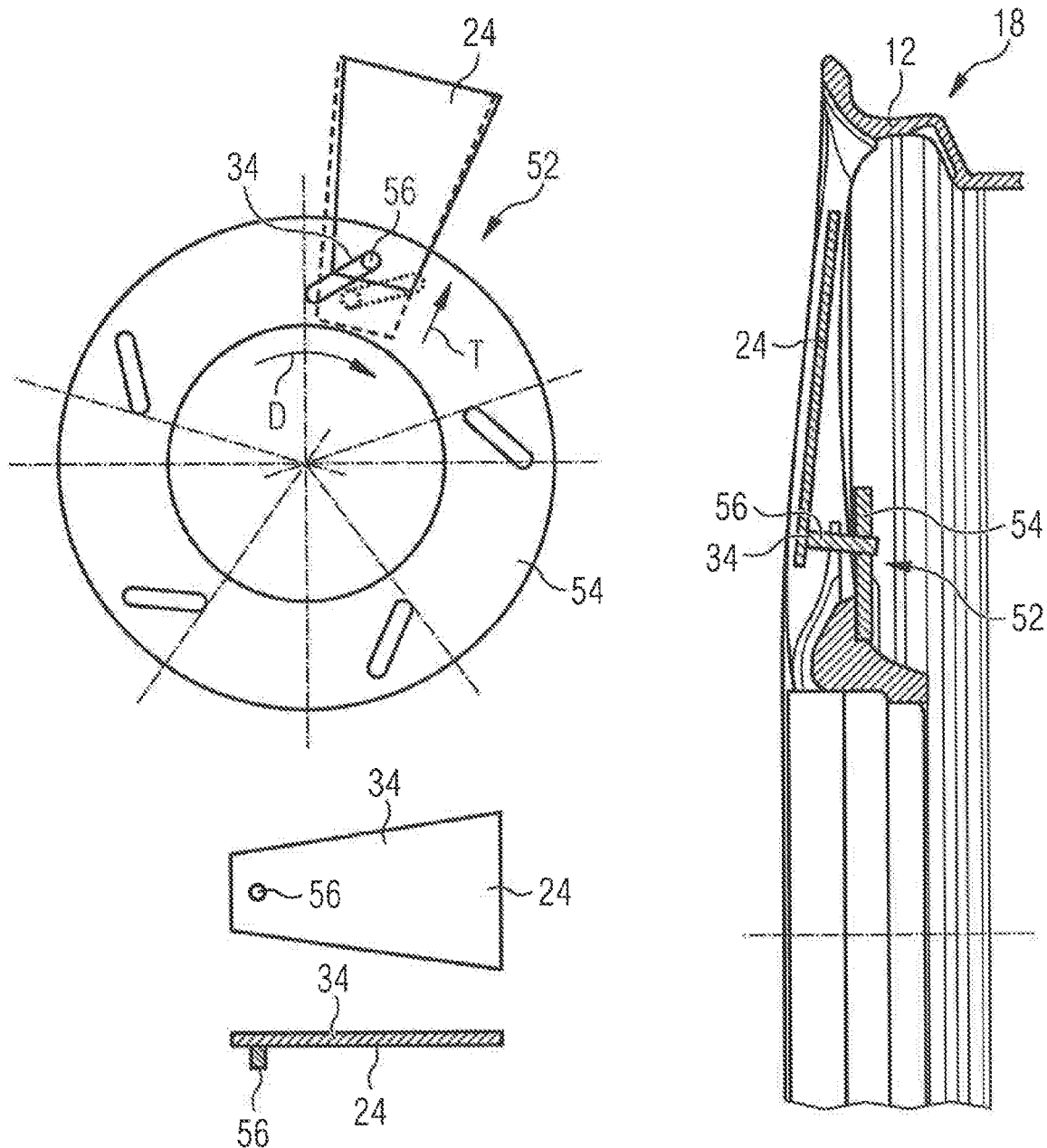
FIG. 7 shows a wheel rim according to the invention in various schematic representations.

In the exemplary embodiment of FIG. 7, a rotational movement D, represented by a curved arrow, of the transmission element 54 on the rim body side is converted into a translational movement T, represented by a straight arrow, of the transmission element 56 on the cover element side. In the present case, the transmission element 54 on the rim body side has for this purpose slots which are angled relative to the peripheral direction, into which the transmission elements 56 on the cover element side engage.

Figure 8:
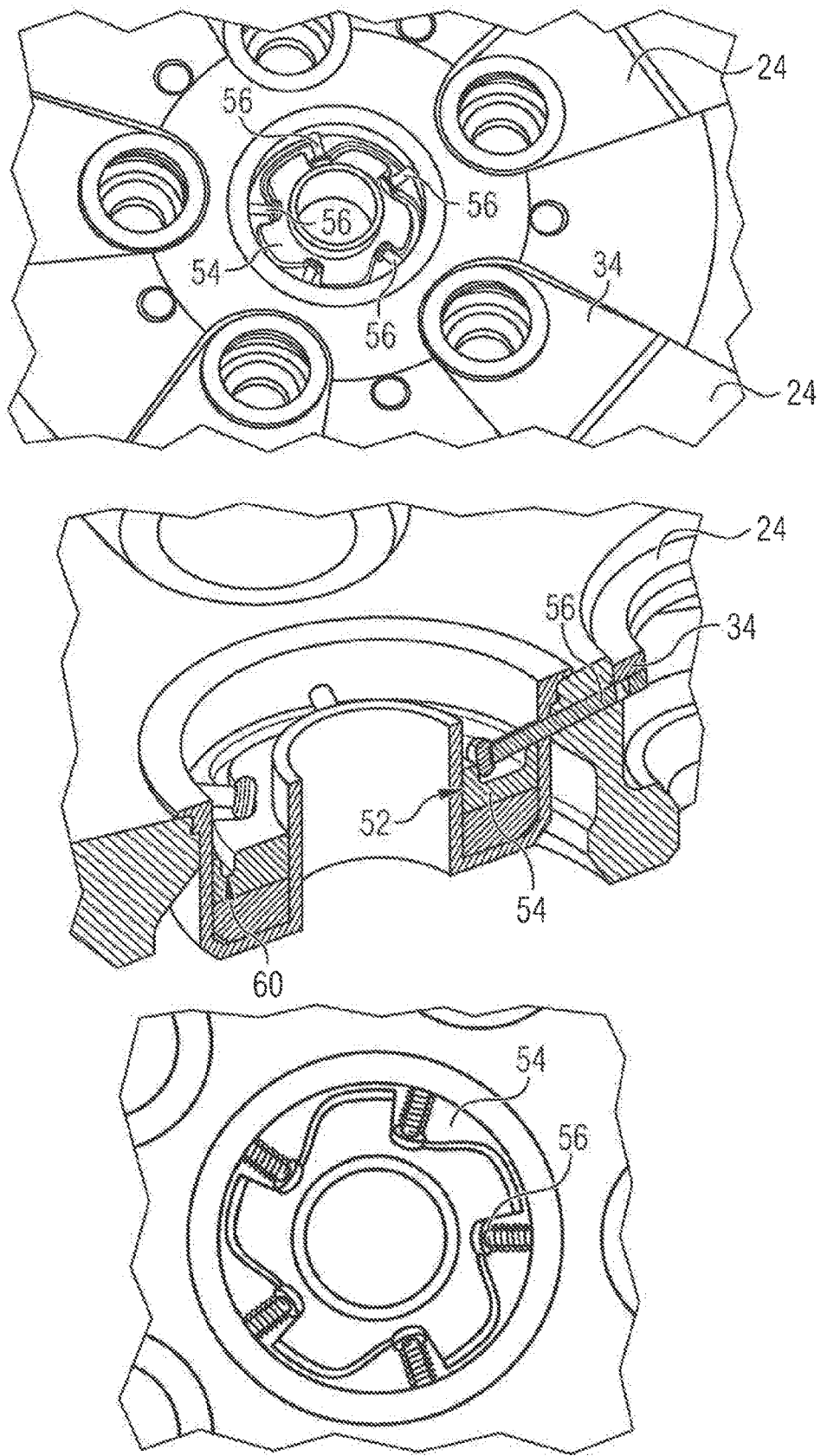
FIG. 8 shows a wheel rim according to the invention in various representations.

In the exemplary embodiment of FIG. 8, the transmission element 54 on the rim body side is a cam track, or it comprises a groove cam. A groove 60 of the groove cam extends along a path which deviates from a circular path. Multiple transmission elements 56 on the cover element side engage into the groove 60 of the transmission element 54 on the rim body side. On rotation of the transmission element 54 on the rim body side, the transmission elements 56 on the cover element side each move translationally in the translational movement direction T, that is to say in the present case predominantly radially outwards. The transmission elements 56 on the cover element side are thereby connected to the actuating portions 34 of the cover elements 24.

In the exemplary embodiment of FIG. 8, the transmission element 54 on the rim body side is a conical slide 62. A pressure surface 64 of the conical slide 62 extends sloping relative to a translational movement direction T of the transmission elements 56 on the cover element side. The transmission elements 56 on the cover element side are positively driven in the translational movement direction T.

In the case of a translational movement in the axial direction A of the transmission element 54 on the rim body side, the transmission elements 56 on the cover element side each move translationally in the translational movement direction T, that is to say in the present case predominantly radially outwards. The transmission elements 56 on the cover element side are thereby connected to the actuating portions 34 of the cover elements 24. The conical slide 62 can be moved translationally by application of pressure medium to a pressure chamber 68.

The actuating device 26 can comprise an expansion element 70 which is coupled with the actuating portion 34 of the cover element 24 in such a manner that a change in volume of the expansion element 70 brings about a movement of the actuating portion 34 of the cover element 24. The expansion element 70 can, as in the present case, be in the form of an annular hollow body. Such a variant is shown in FIG. 10. The cover elements 24 are connected via translationally movable slides 72 to an expansion element 70, which in the present case is in the form of a hose. In the configuration shown in FIG. 10, pressure medium is not applied to the expansion element 70, so that the spring-biased slides 72 compress the expansion element 70. If pressure medium is applied to the expansion element 70, it expands and moves the slides 72 against their spring bias. The slides 72 in turn move the actuating portions 34 of the cover elements 24. An expansion element 70 can be a variable-volume body formed in one piece. In particular, an expansion element 70 can be configured without rigid elements which are displaceable translationally relative to one another. An expansion element 70 can in particular have elastic walls.

Figure 11:
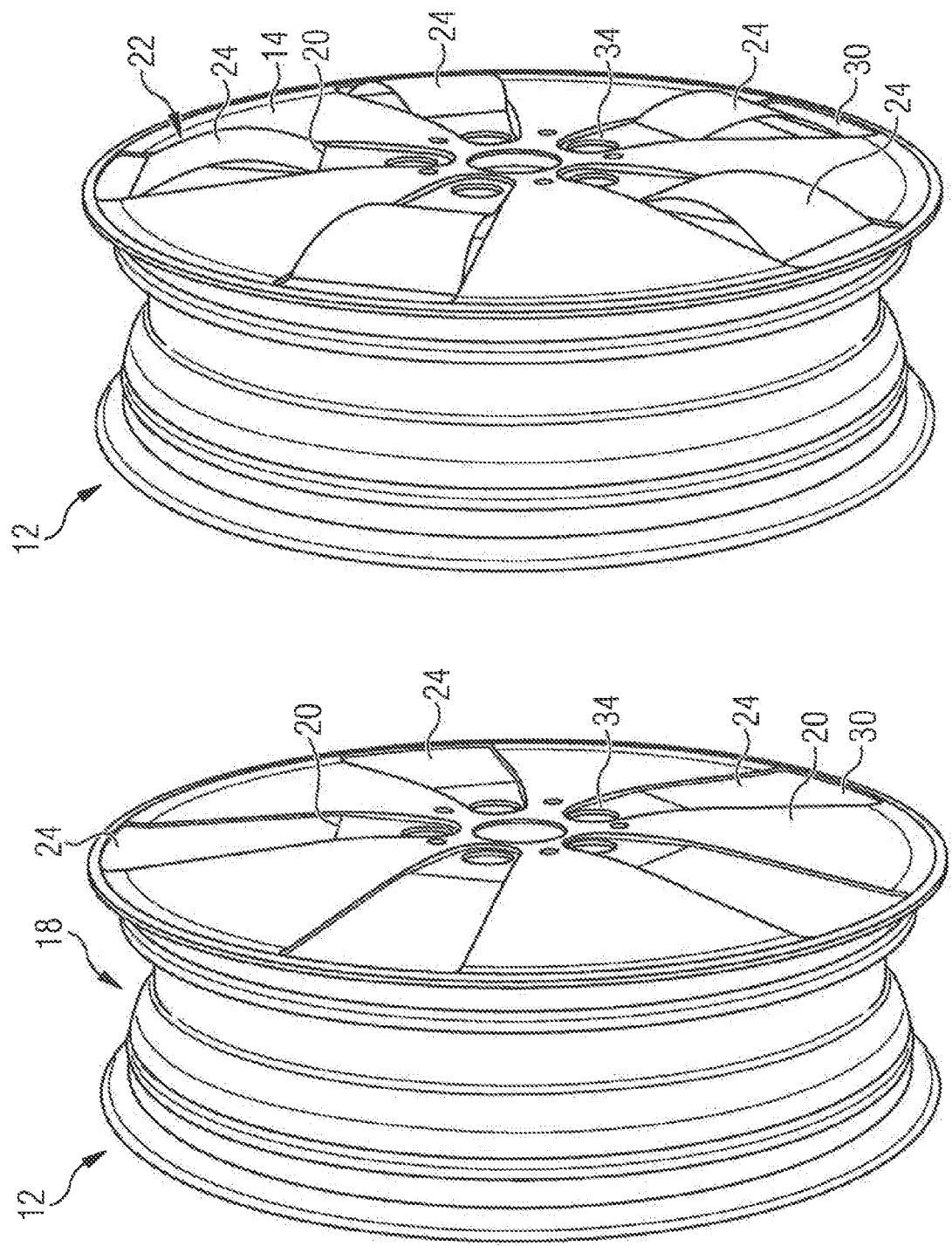
FIG. 11 shows a wheel rim according to the invention in a perspective representation.

FIG. 11 shows a wheel rim 12 according to the invention, wherein the representation on the left of FIG. 11 shows the cover elements 24 in their closed state and the representation on the right of FIG. 11 shows the cover elements 24 in their maximally open state. In their closed state, the cover elements 24 contact the rim body 14 with all their edges. In the open state, a middle region of the cover elements 24 is lifted from the rim body 14. A radially inner and a radially outer region lie against the rim body 14.

Figure 12:
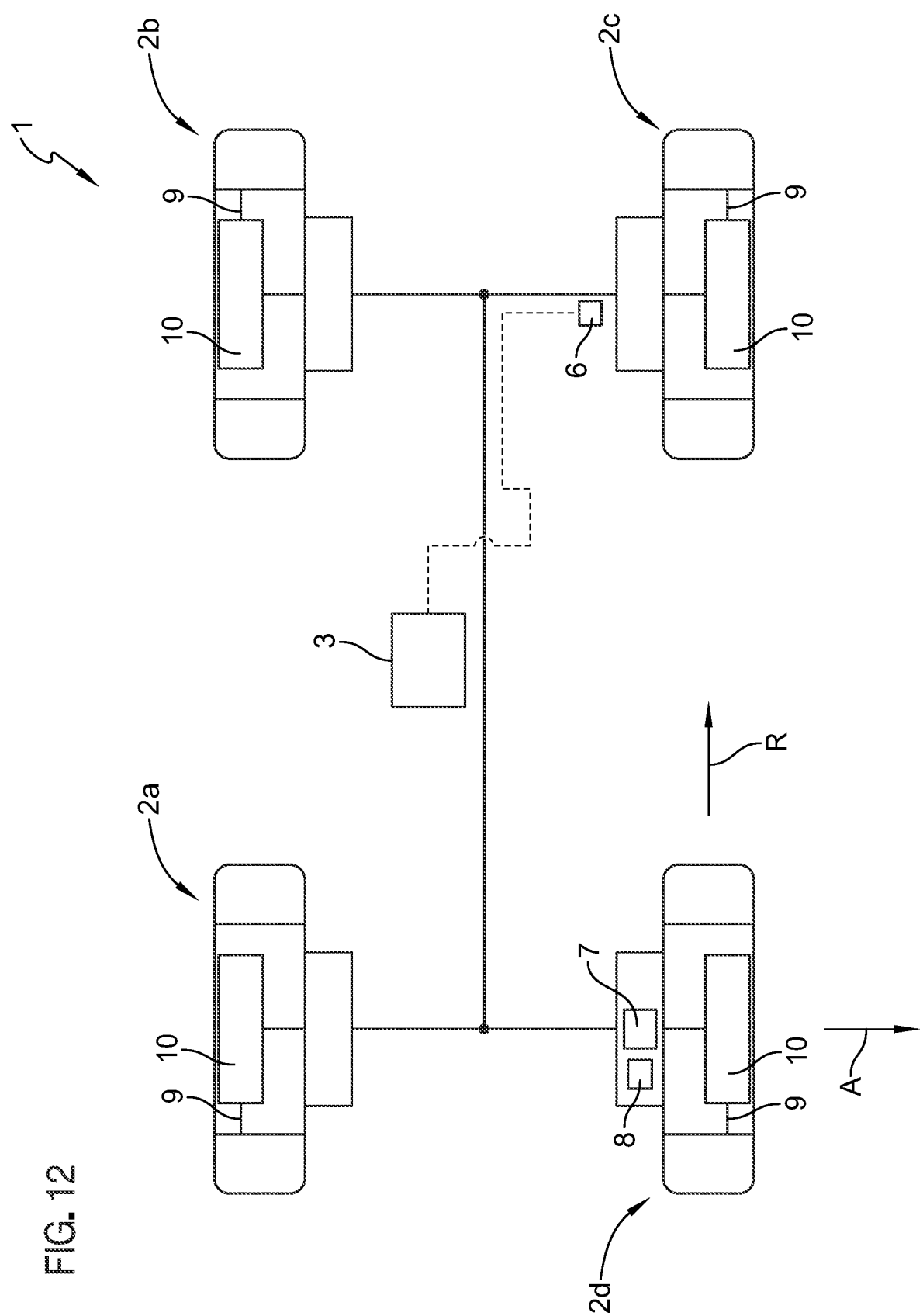
FIG. 12 shows a schematic vehicle according to the invention.

FIG. 12 shows a vehicle 1 according to the invention represented schematically. In the present case, the vehicle has four vehicle wheels 2, which are marked 2a-2d, wherein the present invention is not limited to four-wheeled vehicles 1. The vehicle wheels 2 will be described in greater detail hereinbelow. In the present example, each of the wheels 2 has an associated compressor arrangement 10 shown schematically in FIG. 1. This is not essential, however. The compressor arrangement 10 can be used to provide pressure medium for the actuating device 26, for the expansion element 70 or for the pressure-receiving region 48.

In the case of a first vehicle wheel 2a, the compressor arrangement 10 is in the form of a mechanically driven compressor arrangement 10 with a radially movable compressor component.

In the case of a further vehicle wheel 2b, the compressor arrangement 10 is in the form of a mechanically driven compressor arrangement with an axially movable compressor component.

In the case of a further vehicle wheel 2c, the compressor arrangement 10 is in the form of an electrically driven compressor arrangement 10. The electrical energy for operating the compressor arrangement 10 is transmitted from the main battery 3 of the vehicle via a preferably contactless, preferably inductive, transmission device 6, represented symbolically, from the wheel carrier side to the hub side. The transmission device 6 can also be formed by sliding contacts.

In the case of a further vehicle wheel 2d, the electrical energy for operating the compressor arrangement 10 is provided directly on the hub side via an energy source. The energy source can be an energy store 7, for example an accumulator, or an energy producer 8, preferably a generator. The energy producer 8 uses the rotational relative movement between the wheel carrier side and the hub side to generate power.

Such an energy producer 8 or an energy store 7, which is mounted on the hub side, can also be used directly for the electrical actuation of the actuating device 26.

Also advantageous is the combination of an energy store 7 with an energy producer 8. An electrical compressor arrangement 10 and/or an electrically operable actuating device 26 can thus be operated.

A pressure medium channel bears reference numeral 9 in FIG. 12.

Figure 13:
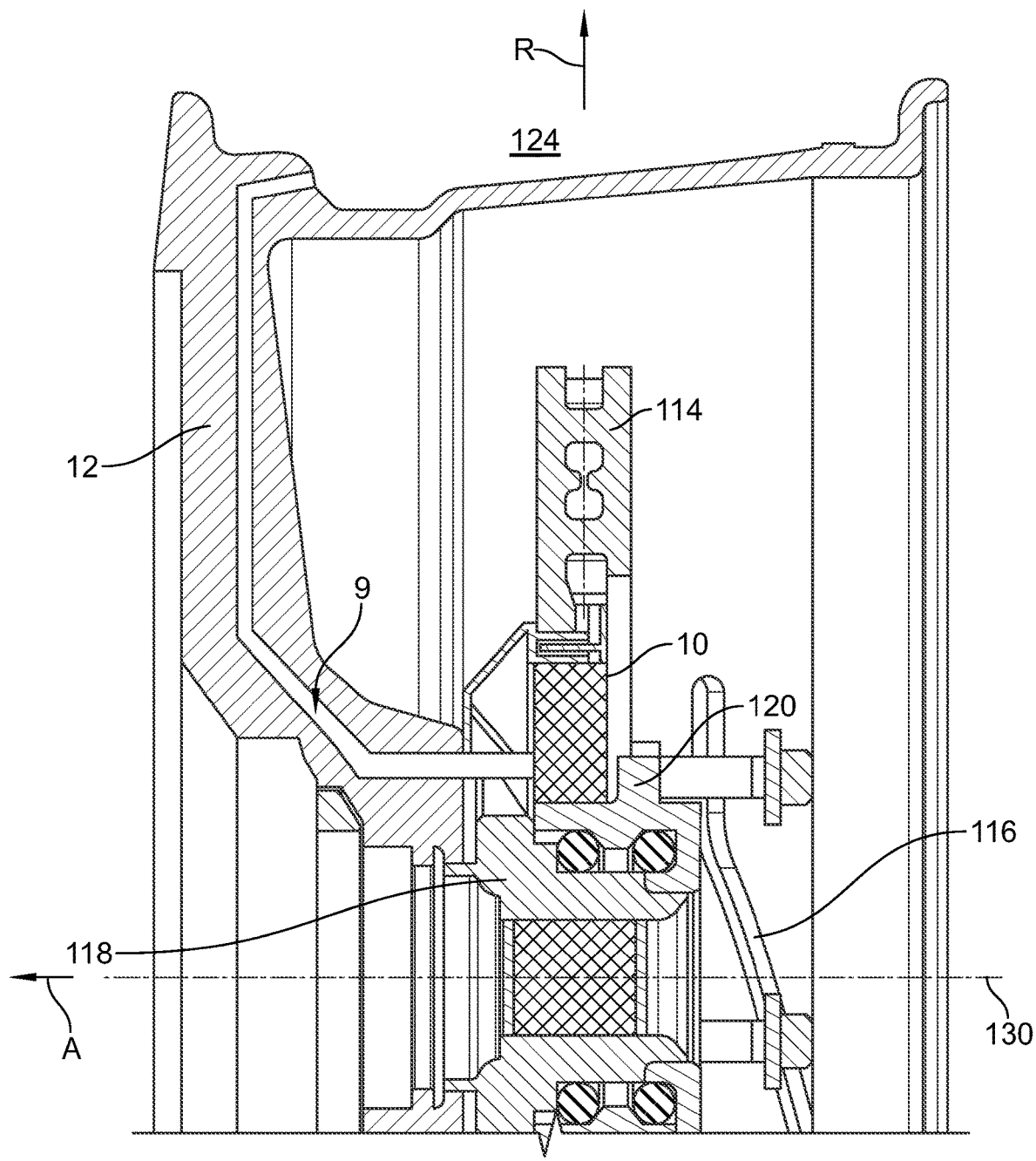
FIG. 13 shows a wheel rim according to the invention in a sectional representation.

In FIG. 13, the installation position of a mechanically driven compressor arrangement 10, as arranged at the above-mentioned wheels 2a and 2b, is shown schematically. The compressor arrangement 10 itself is shown only schematically in FIG. 13 by a cross-hatched area.

A brake disk 114, a wheel carrier 116, a wheel hub 118 and a wheel bearing 120 are shown with reference numerals.

A pressure medium channel 9 extends from the compressor arrangement 10 to a tire cavity 124. The tire itself is not shown in FIG. 13.

An axis of rotation 130 extends in the axial direction A. During operation of the vehicle, the hub side, and thus the components on the hub side, rotates about the axis of rotation 130 relative to the wheel carrier side, that is to say relative to the components on the wheel carrier side, such as, for example, relative to the wheel carrier or also relative to the passenger compartment of the vehicle.

Figure 14:
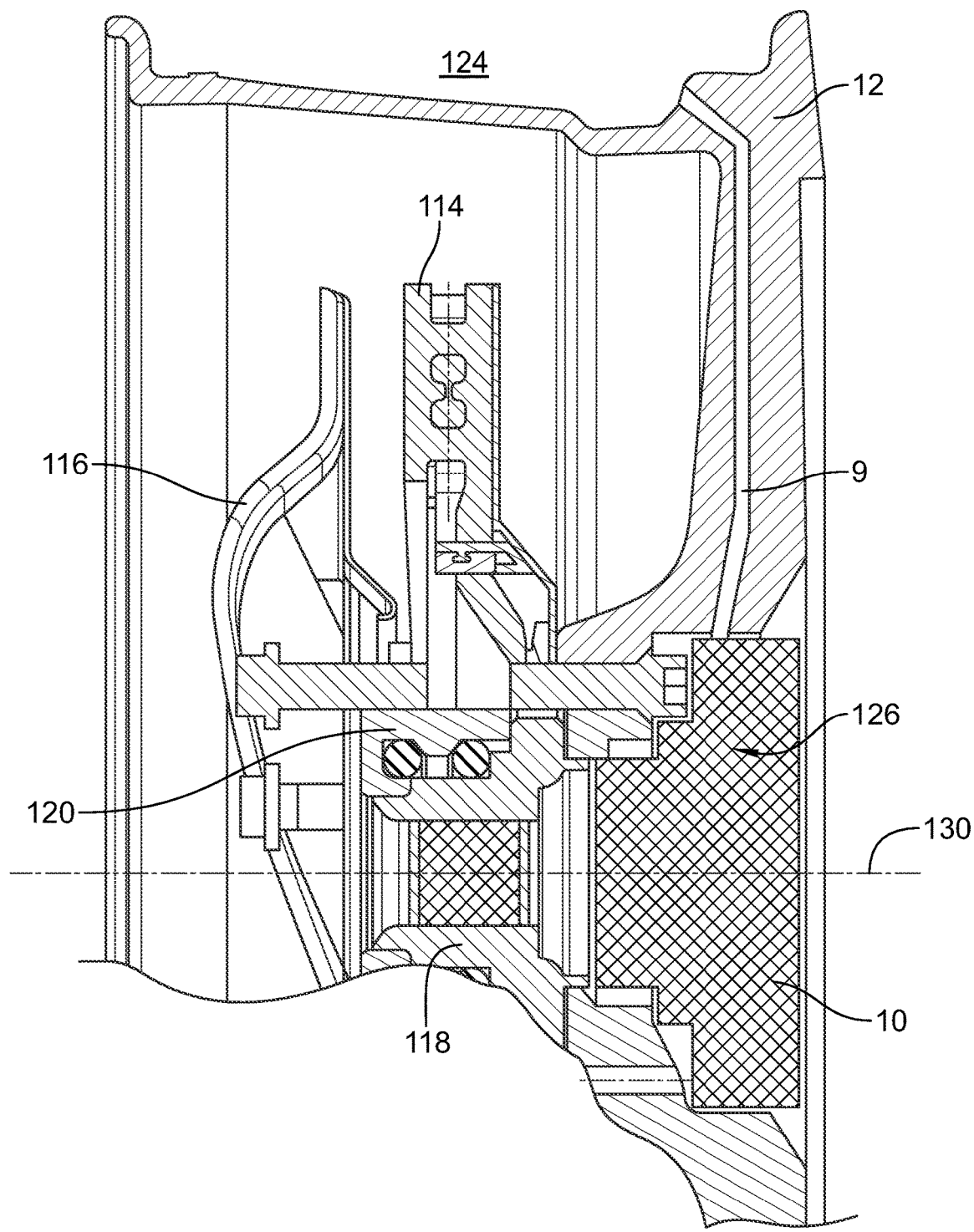
FIG. 14 shows a wheel rim according to the invention in a sectional representation.

In FIG. 14, the installation position of an electrically driven compressor arrangement 10, as arranged at the above-mentioned wheels 2c and 2d, is shown in a representation similar to the representation of FIG. 2. The electrically driven compressor arrangement 10 is arranged in the region of the wheel hub receiver 26, preferably in a wheel hub receiver 126.

Figure 15:
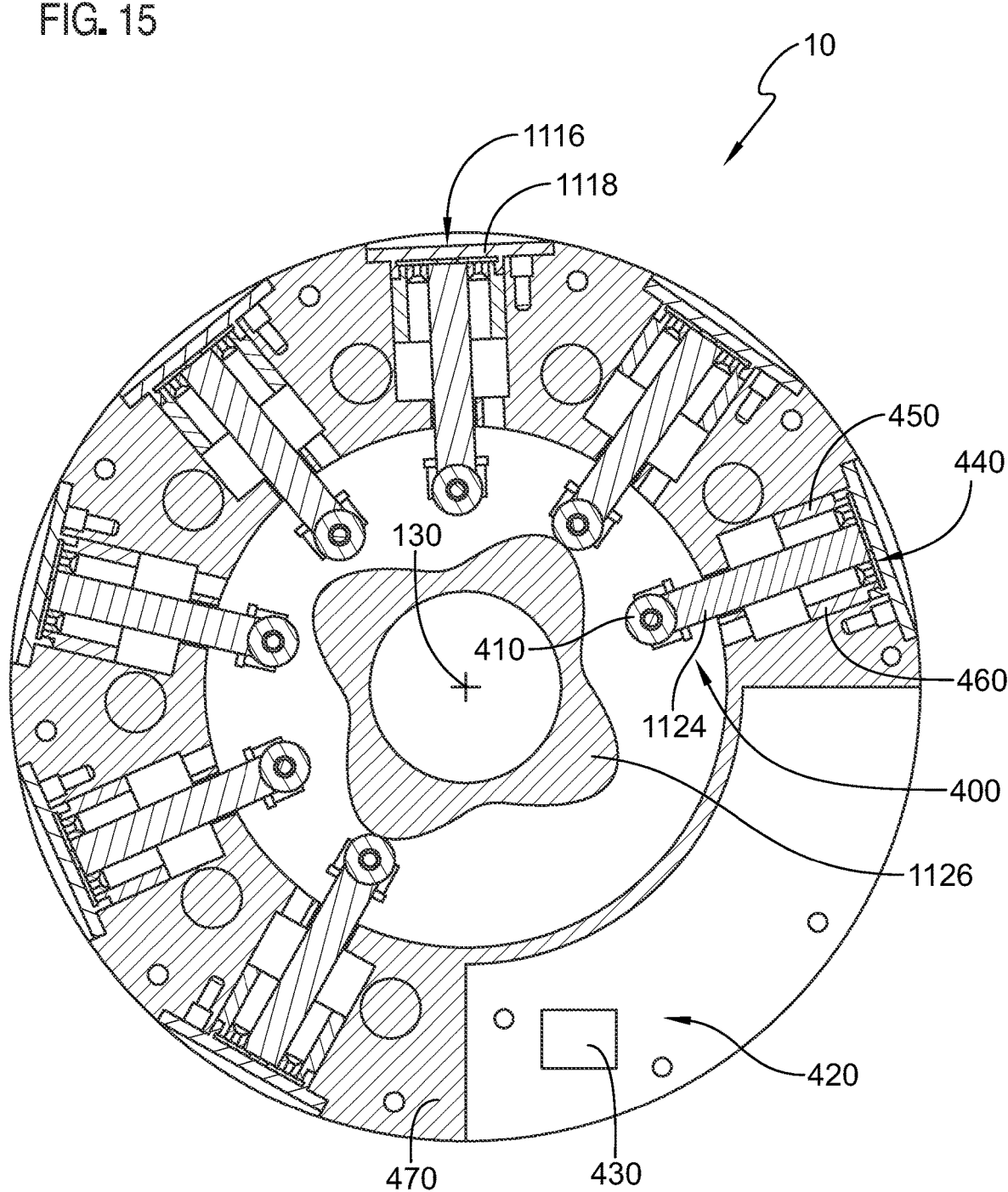
FIG. 15 shows a compressor arrangement.

FIG. 15 shows an embodiment of a mechanical compressor arrangement 10. Compressor components 1118 are configured to perform an oscillating translational movement in the radial direction.

The transmission parts 1124 on the hub side are thereby in the form of roller tappets 400. At their end facing a transmission part 1126 on the wheel carrier side, they each have a self-lubricating roller 410.

Flutter valves 440 are arranged at each of the compressor components 1118. Dual seals 450 are also arranged at the compressor components 1118, each of which dual seals delimits a lubricant reservoir 460 of the compressor component 1118 and at the same time seals a compression chamber 1116 on the hub side relative to the compressor component 1118.

A part 470 on the hub side of the compressor arrangement 10 is largely annular in form and in the present case comprises all the parts shown in FIG. 15 of the compressor arrangement 10 apart from the transmission part 1126 on the wheel carrier side.

The invention claimed is:

1. A wheel rim for a vehicle wheel, the wheel rim comprising:
   a rim body having a hub portion, a rim well for receiving a tire, multiple carrier portions arranged between the hub portion and the rim well, and at least one gap arranged between the carrier portions, and
   at least one cover element associated with the at least one gap, the at least one cover element being transferable via actuation of an actuating device at least from a first position to a second position, wherein covering of the at least one gap by the at least one cover element in the first position is different from covering of the at least one gap by the at least one cover element in the second position, wherein the at least one cover element deforms upon transferal between the first position and the second position, and wherein the actuating device is so configured that the at least one cover element is transferable from at least one of the second position to the first position and the first position to the second position by pneumatic, electrical or magnetic actuation.

2. The wheel rim as claimed in claim 1, wherein the at least one cover element deforms elastically reversibly.

3. The wheel rim as claimed in claim 1, wherein the at least one cover element comprises a fastening portion undisplaceably connected to the rim body of the wheel rim.

4. The wheel rim as claimed in claim 1, wherein the at least one cover element comprises an actuating portion movable relative to the rim body of the wheel rim.

5. The wheel rim as claimed in claim 4, wherein the actuating device comprises an expansion element coupled with the actuating portion of the at least one cover element in such a manner that a change in volume of the expansion element brings about a movement of the actuating portion of the at least one cover element.

6. The wheel rim as claimed in claim 1, wherein the at least one cover element in the first position or in the second position is in a closed state, in which the at least one gap is closed by the at least one cover element.

7. The wheel rim as claimed in claim 6, wherein with the at least one cover element in the closed state, a surface of the wheel rim remote from the vehicle, when seen in an axial direction of the wheel rim, is free of openings.

8. The wheel rim as claimed in claim 6, wherein with the at least one cover element in the closed state, the at least one cover element extends flush with the carrier portions which delimit the at least one gap.

9. The wheel rim as claimed in claim 1, wherein the at least one cover element in the first position or in the second position is in a maximally open state, in which the at least one gap is at least partially exposed by the at least one cover element.

10. The wheel rim as claimed in claim 9, wherein the at least one cover element in the maximally open state is at least in some regions curved axially outwards, away from a vehicle side of the wheel rim, or axially inwards.

11. The wheel rim as claimed in any claim 1, wherein the at least one cover element is transferable by the actuating device to an angled state, wherein the at least one cover element in the angled state is so arranged relative to the rim body that, upon rotation of the wheel rim, air is guided by the at least one cover element into the at least one gap.

12. The wheel rim as claimed in claim 1, wherein the at least one gap includes multiple gaps and the at least one cover element includes multiple cover elements, and wherein at least some of the multiple gaps are each associated with a different one of the multiple cover elements.

13. The wheel rim as claimed in claim 1, wherein the wheel rim has an inner cover element associated with the at least one gap, wherein the inner cover element is transferable at least from a first position to a second position by actuation of the actuating device, and wherein covering of the at least one gap by the inner cover element in the first position of the inner cover element is different from covering of the at least one gap by the inner cover element in the second position of the inner cover element, wherein the inner cover element is arranged on a side of the rim body that faces the vehicle, and wherein the inner cover element deforms upon transferal of the inner cover element between the first position of the inner cover element and the second position of the inner cover element.

14. The wheel rim as claimed in claim 13, wherein the inner cover element and the at least one cover element, upon transferal of each into a maximally open state, curve in one of the same direction or in different directions.

15. The wheel rim as claimed in claim 13, wherein with the inner cover element a closed state, the inner cover element extends flush with the carrier portions which delimit the at least one gap.

16. The wheel rim as claimed in claim 13, wherein at least one of the at least one cover element and the inner cover element comprises a material that deforms upon application of a voltage thereto.

17. The wheel rim as claimed in claim 1, wherein the at least one cover element is so configured that the at least one cover element returns to the first position or the second position of the at least one cover element upon transferal by the actuating device to a position other than the first position or the second position of the at least one cover element but not held in that position.

18. The wheel rim as claimed in claim 1, wherein the at least one cover element is transferred from the first position of the at least one cover element to the second position of the at least one cover element on heating of the at least one cover element.

19. The wheel rim as claimed in claim 1, wherein the at least one cover element has a material thickness in an axial direction which changes over a surface of the at least one cover element that extends in a peripheral direction and in a radial direction.

20. The wheel rim as claimed in claim 1, wherein the at least one cover element is so configured and arranged to have an air attack surface, the air attack surface being so configured and arranged that air resistance resulting from rotation of the wheel rim urges the at least one cover element from one of the first position and the second position of the at least one cover element to the other of the first position and the second position of the at least one cover element.

21. The wheel rim as claimed in claim 1, wherein the at least one cover element comprises a pressure-receiving region to which a pressure medium can be applied, wherein the at least one cover element is in the first position of the at least one cover element when the pressure medium is not applied to the pressure-receiving region, and wherein the at least one cover element deforms to the second position of the at least one cover element upon application of the pressure medium to the pressure-receiving region.

22. The wheel rim as claimed in claim 1, further comprising a filter element arranged in the at least one gap, which filter element is configured to filter brake dust particles from the air which flows through the at least one gap.

23. The wheel rim as claimed in claim 1, wherein the actuating device comprises a transmission having a first transmission element on a rim body side of the actuating device and having a second transmission element on a cover element side of the actuating device, wherein the second transmission element is coupled with an actuating portion of the at least one cover element, and wherein the transmission is so configured that the transmission converts a movement of the first transmission element a movement of the second transmission element.

24. The wheel rim as claimed in claim 23, further comprising at least two of the transmissions each having respective first and second transmission elements, wherein the at least one cover element comprises at least two cover elements each connected by a respective actuating portion thereof to the first transmission element of a respective one of the at least two transmissions.

25. The wheel rim as claimed in claim 1, wherein the actuating device is pneumatically actuatable via a pressure medium, wherein a tire cavity of the vehicle wheel is configured to provide the pressure medium under pressure, and wherein a compressor arrangement is arranged in a region of the wheel rim and comprises at least one compression chamber.

\* \* \* \* \*